United States Patent [19]
Johnson

[11] 4,317,961
[45] Mar. 2, 1982

[54] TELEPHONE-CONFERENCING APPARATUS AND METHOD

[75] Inventor: Avery R. Johnson, Milford, N.H.

[73] Assignee: Small World Exchange, Inc., Nashua, N.H.

[21] Appl. No.: 23,452

[22] Filed: Mar. 23, 1979

[51] Int. Cl.³ .............................................. H04M 3/56
[52] U.S. Cl. .............................................. 179/18 BC
[58] Field of Search ............. 179/18 BC, 1 CN, 18 B, 179/27 D, 8 A, 9, 10, 7.1 R, 7 R, 15 BY, 175.2 C, 175.2 R; 340/152 R, 153, 154, 151; 370/58, 62

[56] References Cited

U.S. PATENT DOCUMENTS

| | | | |
|---|---|---|---|
| 1,679,567 | 8/1928 | Gardner | 179/18 BC |
| 1,714,303 | 5/1929 | Friendly | 179/18 BC |
| 3,170,042 | 2/1965 | Giroud et al. | 179/18 BC X |
| 3,182,134 | 5/1965 | Hochgraf | 179/18 BC |
| 3,204,043 | 8/1965 | Arseneau et al. | 179/18 BC |
| 3,274,342 | 9/1966 | Brightman | 179/18 BC |
| 3,495,041 | 2/1970 | Gaunt, Jr. et al. | 179/18 BC X |
| 3,903,373 | 9/1975 | Güeldenpfennig et al. | 179/18 BC |
| 3,976,841 | 8/1976 | Picandet | 179/18 BG X |
| 4,027,098 | 5/1977 | Reisch et al. | 178/3 |
| 4,150,259 | 4/1979 | Fenton et al. | 179/18 BC |
| 4,153,817 | 5/1979 | D'Ortenzio | 179/18 BC |
| 4,154,988 | 5/1979 | Fechalos et al. | 179/18 B |
| 4,229,814 | 10/1980 | Betts | 370/62 |

*Primary Examiner*—Thomas W. Brown
*Attorney, Agent, or Firm*—Kenway & Jenney

[57] ABSTRACT

A telephone conferencing and inquiry handling apparatus and method provide a plurality of incoming calls with access to one or more ongoing or new communications groupings or pools. Apparatus for monitoring the level of voice energy on the incoming lines allows identification of a caller and allows registration of callers' opinions, i.e. votes. Confirmation signals provide a caller with audible feedback that his vote has been recorded. New subscribers, or limited or restricted subscribers, can access the system on a monitor-only basis, in which they can listen to ongoing conversation pools but are unable themselves to speak with other members of the pool.

10 Claims, 8 Drawing Figures

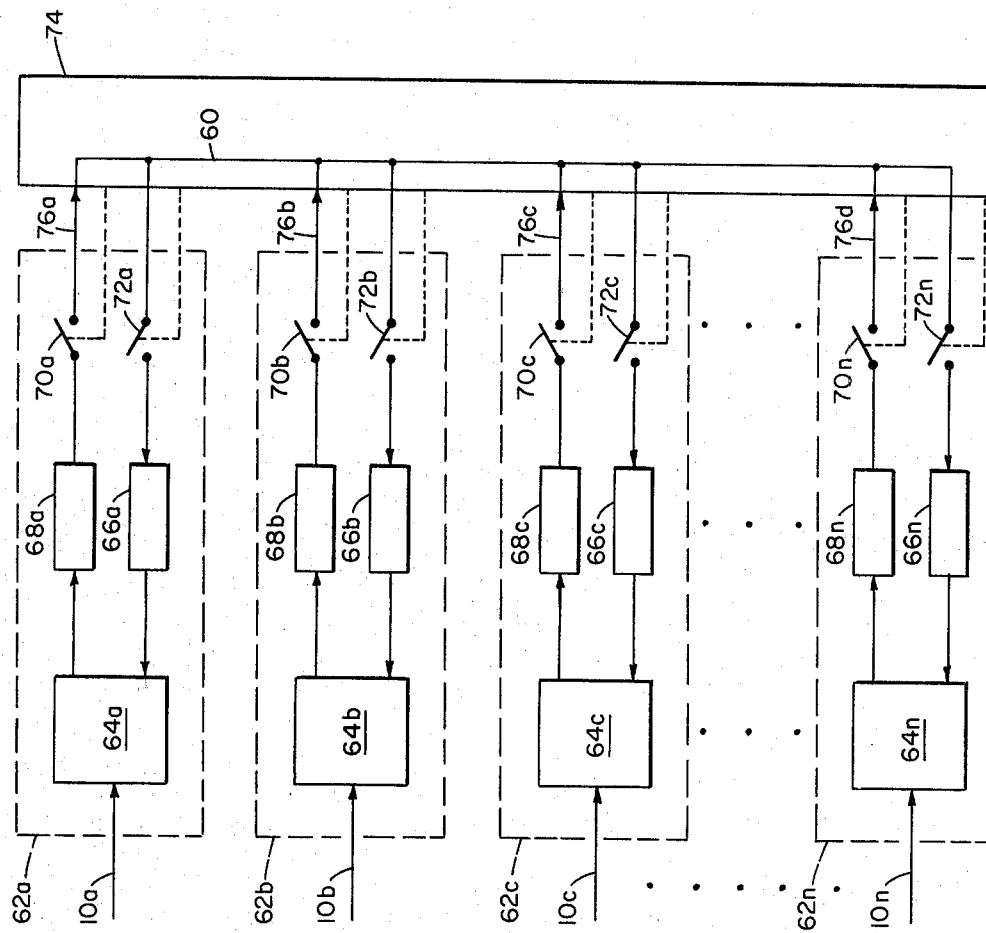
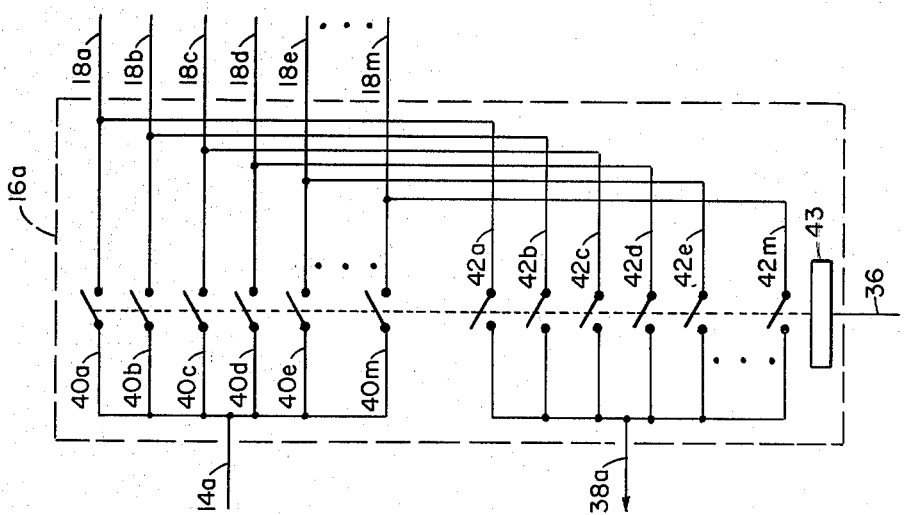

TIMING DIAGRAM

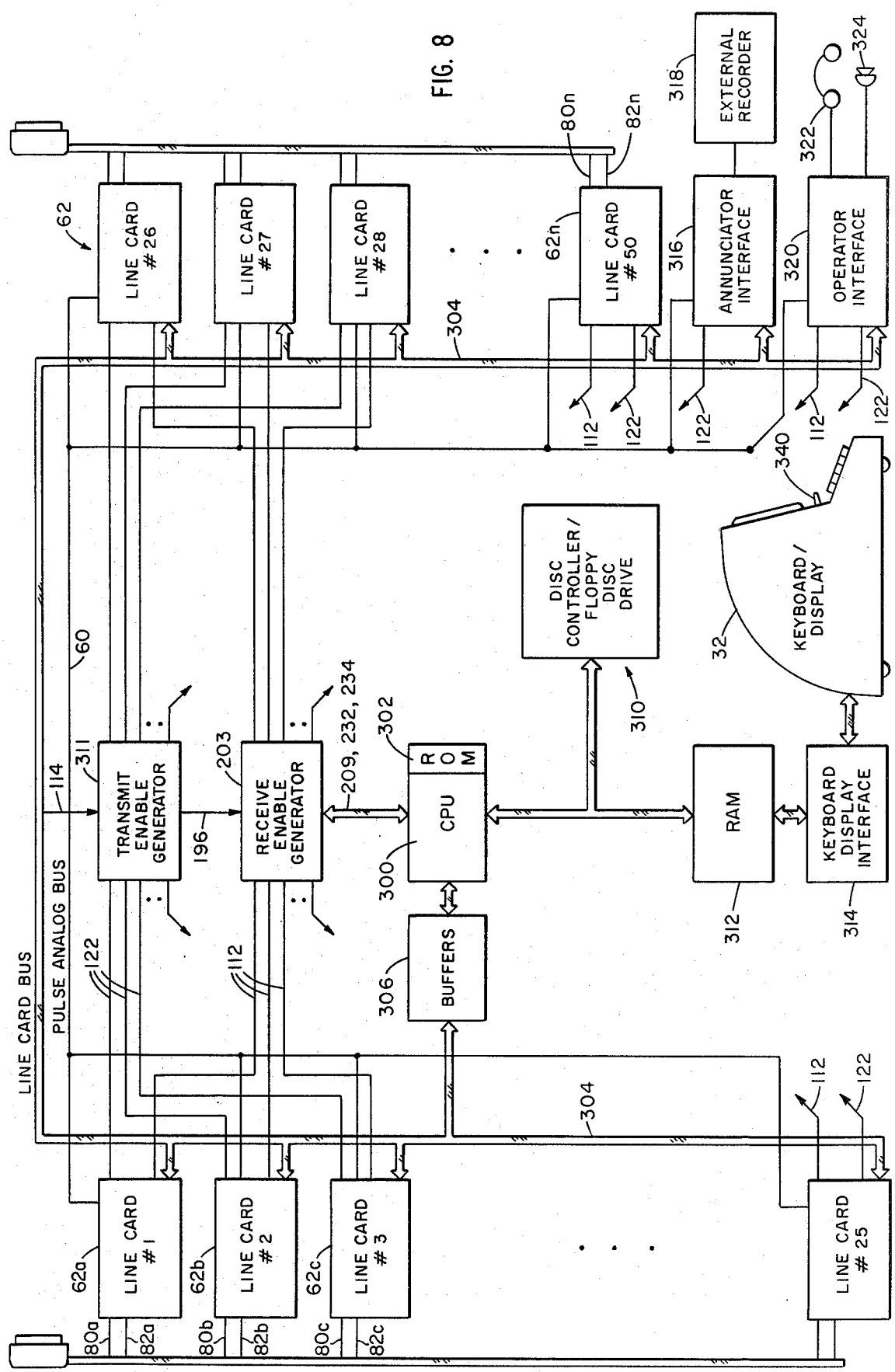

TELEPHONE-CONFERENCING APPARATUS AND METHOD

BACKGROUND OF THE INVENTION

This invention relates generally to telephone communications methods and apparatus and in particular to a telephone conferencing and inquiry handling method and apparatus which enable automatic pooling or conferencing of incoming telephone calls.

Telephone conferencing systems have been available from both the private sector and from the telephone operating companies for many years. These systems generally provide intercommunications for a plurality of previously identified individuals. Thus a typical "conference call" might include five or more individuals, each able to talk to and hear any other individual connected into the conference. Conferences of this type are most often prearranged and typically a single operator calls each participant. The telephone company equipment enables a telephone operator to arrange the conference call, once the operator is given the telephone addresses of the persons involved. More recently, the telephone company and other communication equipment manufacturers have made available equipment with which a local "private" operator arranges, without requiring assistance of the telephone utility, a conference call with selected designated individuals.

There also exist information disseminating systems with which an incoming caller specifies a selected tape recording, and an inhouse operator connects the caller to it. There are other telephone listening systems which enable incoming callers to listen to a common recording such as the well known Weather or Time recordings provided by local telephone companies.

The potential applications for the telephone conferencing concept have been barely tapped, however, due at least in part to the unavailability of the necessary equipment.

It is therefore an object of this invention to provide a telephone conferencing method and apparatus which enable totally random and unscheduled incoming calls to be flexibly interconnected, substantially at will, to provide intercommunications between plural callers. It is also an object to allow the callers to be individually and automatically routed through a series of defined conferencing steps.

The objects of the invention also include providing a telephone communications method and apparatus for collecting and redistributing information for use by incoming telephone callers. Another object of the invention is a telephone communications method and apparatus which flexibly and easily interfaces with a plurality of incoming spontaneous calls to pool or interconnect the calls into selected groupings or conference pools. Further objects of the invention are a telephone conferencing method and apparatus which provide simple operator control, which enable substantially automatic operation of the equipment, which enable automatic monitoring of incoming speech energy levels, which provide high reliability, and which enable the interchange of ideas between incoming callers.

SUMMARY OF THE INVENTION

The invention thus relates to a telephone conferencing apparatus and method. The apparatus features an input element for concurrently receiving numerous telephone calls over different incoming lines and a switching element for selectively connecting each incoming line to a single conference group or to any of a number of conference groupings. With such an arrangement, any incoming line assigned to a grouping can communicate with all of the other incoming lines connected to the same grouping, and each conference grouping has a capacity of at least three incoming calls or lines. In one aspect of the invention, the incoming calls are automatically switched, i.e. without operator intervention, to a selected conference grouping.

The equipment, in one form, features an element for selectively switching any incoming call from one grouping to another grouping. In particular, a call can be selectively switched to a private inquiry-receiving condition, in which the selective line can only listen to the other lines, but not speak to them. Further, an operator can listen to and speak with any selected line.

In another aspect of the invention, the equipment connects the incoming, calling lines into groupings in such a manner that all lines receive messages from the grouping, i.e. from all the other grouped lines, but only a selected sub-group of the incoming lines can transmit messages.

The equipment can also include a restricting element which operates with the switching element to restrict an incoming telephone line to a receive-only condition. This apparatus can use an operator control element that provides manual control of a switch element associated with each incoming line. The switch element, when in a first state, places the associated incoming line in the receive-only condition, and when in a second state places the line in a condition for both receiving and sending.

The invention also provides a telephone conferencing method which features the steps of concurrently receiving numerous incoming calls over different incoming telephone lines, and selectively connecting any of the incoming lines to any of a plurality of conference groupings. Generally, the incoming lines are connected to a single conference grouping, but the invention can be practiced with connection to more than one grouping. The incoming lines connected to a selected grouping are able to communicate with all other incoming lines connected to the grouping, and each conference grouping has the capacity of at least three incoming calls. In one aspect, the method features automatically connecting the incoming calls to a main conference grouping.

In a particular aspect, the method further features the step of switching any of the incoming calls from one grouping to another. In one embodiment, the method also features selectively switching any of the incoming lines to a private inquiry-receiving condition, in which the selected line cannot communicate with any other incoming line, and connecting an operator controlled communication line in voice communication with the line in that inquiry-receiving condition.

Another aspect of the invention is that the telephone conferencing method features the steps of concurrently receiving a plurality of incoming calls over an associated plurality of incoming telephone lines, and selectively connecting any of the incoming lines to any one of a plurality of conference groupings. The result of this practice is that any incoming line in the grouping receives signals from all of the other incoming lines connected to the grouping, while only a selected sub-group of incoming lines in the grouping can transmit to the other lines. In a particular embodiment, the method further features the steps of restricting an incoming line to a receive-only condition and manually controlling the state of each incoming line from an operator control panel.

These and other features of the invention described herein provide a voice-conferencing system that enables participants to join ad hoc conferences on their initiative simply by calling from any telephone into a single number. The system can link any combination of telephone lines from its multiple-line capacity into a single conference pool or into any of several separate conference groupings. The fact that the initiative for entering the conferencing system lies with the peripheral telephone user offers telephone conferencing in diverse areas such as business, education, political organizing, and even disaster control.

A voice-conferencing system according to the invention can be supervised by a human operator, and the operator can both monitor automatic program-controlled operations and respond to user-initiated inquiries originating in any grouping of the telephone lines.

The capability of a voice-conferencing system according to the invention to place incoming callers into any one of several separate groupings makes it possible for callers to transfer between one conference grouping and other separate conference groupings. Thus, callers initially assigned to separate sub-groupings can be brought together in a single large grouping and they can be transferred in the opposite direction, i.e. from a single grouping to separate sub-groupings. A user can participate in any of these and the other features of conferencing systems which the invention provides simply by calling the single telephone number of the telephone conferencing facility.

In addition, a system according to the invention can identify and report which incoming line is carrying voice communication at any time. The invention applies this voice line locating capability to registering callers' votes of opinion and other preferences. And the system acknowledges each caller's vote with an audible tone. The results of such a poll can be instantly available in tabulated documented form.

An elementary telephone conferencing system according to the invention connects all callers, with two-way voice capability, into a single conferencing pool. Each caller can be given a brief recorded introductory statement before connection to the pool. Such a system can operate entirely automatically, without operator intervention. Further, each caller can effect certain transactions, for example transfer to a second, separate pool or grouping, by using the tone signalling buttons on the telephone.

A more elaborate system according to the invention again introduces each caller with a prerecorded message, before placing the call into a main or first grouping. From that grouping the caller can transfer, typically under operator direction, to any designated sub-grouping. Thus, for example, any number of participants in the main grouping can, on their own request, be organized into a separate sub-grouping. In any of these conferencing systems, when a caller hangs up, the system automatically disconnects the line and thereby clears that line for the next incoming call.

These and other operational advantages which the method and apparatus provide are described herein and, further, will become apparent to those skilled in the art as the invention is placed into commercial practice.

DESCRIPTION OF THE DRAWINGS

Other objects, features, and advantages of the invention will appear from the following description of preferred embodiments taken together with the drawings in which:

FIG. 2 is a more detailed electrical schematic representation of the analog interface elements of FIG. 1 according to the invention;

FIG. 3 is a schematic representation of a pulse amplitude modulated TDM system according to the invention;

FIG. 8 is an electrical schematic of the pulse amplitude modulated TDM system embodiment of the invention.

DESCRIPTION OF PREFERRED EMBODIMENTS

Figure 1:
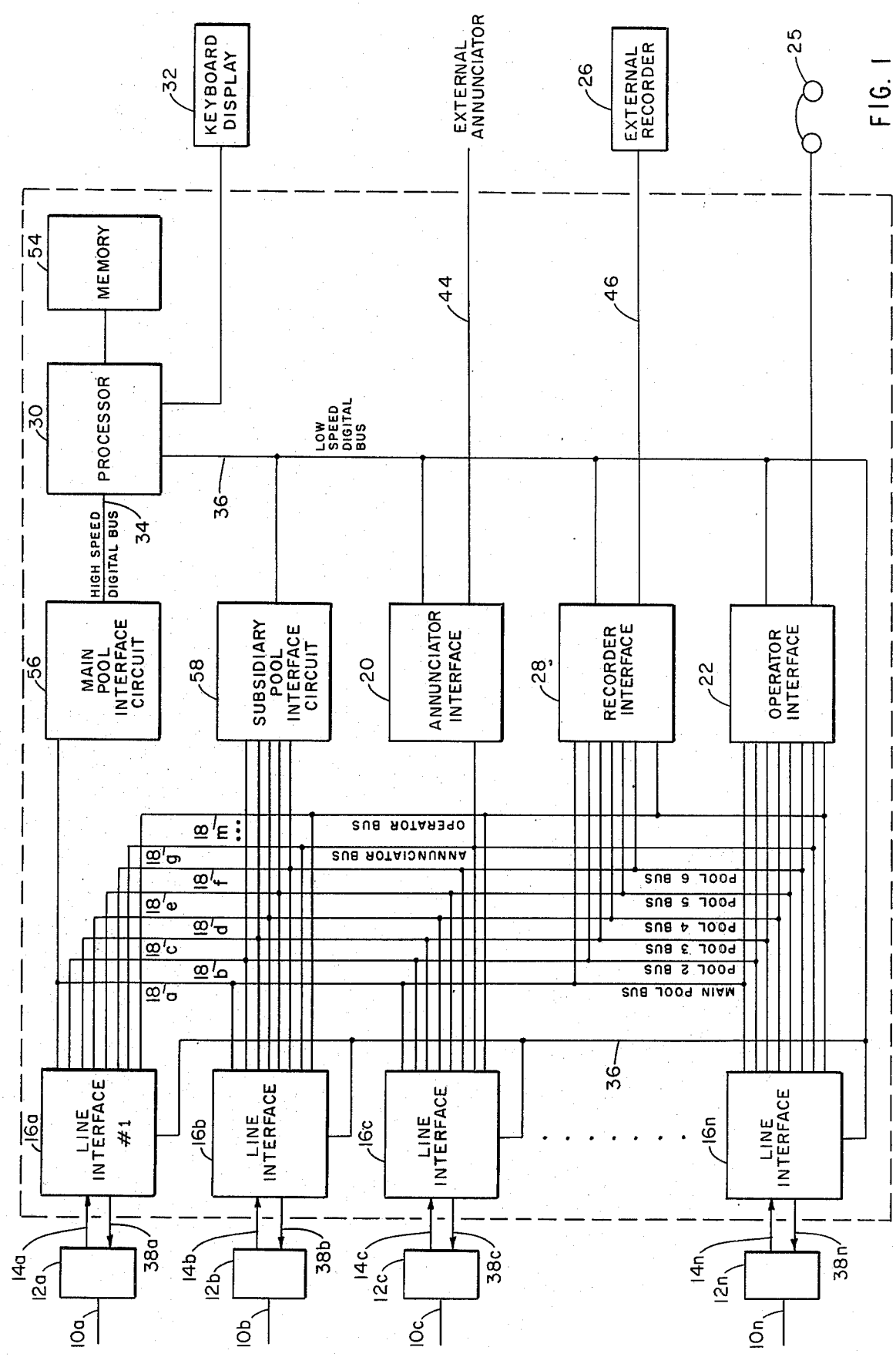
FIG. 1 is an electrical schematic representation of telephone apparatus according to the invention and in which the signal interface occurs in the analog domain.

FIG. 1 shows telephone conferencing apparatus according to one embodiment of the invention and which receives as inputs paired incoming telephone lines 10a, 10b, 10c, . . . , 10n. These lines connect the apparatus with the telephone system serving the region. Generally, each incoming telephone line connects to the output of the switching circuit of a "hunt group" provided by the telephone company's central office. Each telephone line 10, according to the illustrated embodiment, connects to an associated input circuit 12a, 12b, 12c, . . . , 12n which provides a telephone input signal over lines 14a, 14b, 14c, . . . , 14n to a line interface circuit 16a, 16b, 16c, . . . , 16n, respectively. Each line interface circuit 16 connects to a plurality of bus lines 18a, 18b, . . . , 18m. The illustrated system can connect with (n) different paired telephone lines, and provides pooling operations with up to (m) bus lines.

The FIG. 1 configuration represents an "analog" embodiment of the invention. In the analog embodiment, the signal energy levels on the telephone lines 10 remain as time-continuous analog signals during processing within the apparatus even though that processing can be, and in the illustrated embodiment is, under the control of a digital processor. The analog embodiment therefore employs numerous bus lines 18, as illustrated, to form the numerous intercommunications groupings which the invention provides.

Conceptually, each bus line 18 corresponds to one of the available functions of the conferencing system. Thus, in the illustrated embodiment, the bus line 18a functions as a main conversation pool or grouping in which callers can communicate (with possible restrictions) with one another. Bus lines 18b, 18c, 18d, 18e, and 18f each function as secondary conversation pools or groupings in each of which the callers can converse with one another (with possible restrictions). Generally, the number of incoming lines associated with a secondary pool will be less than the number of lines associated with the main pool. Bus line 18g provides an annunciator function and connects incoming callers to a recorded message through an interface 20. Thus, an incoming caller hears a recorded message from this line 18g, when he makes his initial entrance into the conferencing system. Bus line 18m is an operator-controlled conversation line that connects an operator interface circuit 22 to each line interface 16. This operator bus line provides private conversation between the operator who is monitoring the entire system, typically with a headset 25, and one or more selected callers. The operator also has the capability, through the operator interface 22, to monitor and/or converse with each bus line 18.

The illustrated conferencing apparatus also has an external recorder 26 which records the conversations taking place on one or more of the bus lines as determined by a recorder interface 28. The recorder interface 28 typically connects to each bus line, except the annunciator bus line which carries only a recorded message.

A digital processor 30 controls operation of the apparatus in response to commands from an operator control panel, for example a keyboard/display unit 32. The processor 30 provides digital control signals over a high speed bus 34 and a low speed bus 36 for controlling the operation of the interface and other elements of the system. In particular, the processor 30 controls the connections of signals on lines 14 through the line interface circuits 16 to the buses 18, and controls the operations of the annunciator interface 20, the recorder interface 28, and the operator interface 22.

The line interface circuits 16 can employ any of many different circuit configurations. In one embodiment of the invention, described below with reference to FIG. 2, each line interface circuit has a set of digitally controlled solid state analog switches connecting the input signal on a line 14 to any one of the buses. Another set of like analog switches connects any one of the buses 18 as a line interface output over a line 38a, 38b, 38c, ..., 38n.

Referring now to FIG. 2, the illustrated line interface circuit 16a, typical of circuits 16, has a plurality of switching elements 40 and 42 which connect lines 14a and 38a, respectively, to buses 18. Switching elements 40a, 40b, ..., 40m, under the control of a digital logic circuit 43 responsive to the digital signal over bus 36, selectively connect the incoming signal on line 14a to one of buses 18. For example, if the incoming caller desires to enter the main conversation pool, switch 40a closes and connects line 14a with bus line 18a. Correspondingly, the second plurality of switch elements 42a, 42b, 42c, 42d, 42e, ..., 42m, also under the control of digital logic circuit 43, selectively connects the buses 18 to the output line 38a. When, for example, the switch element 42a is closed, the incoming telephone line 10a, which is associated with the particular line interface element 16a, is connected to listen to the main conversation pool on bus line 18a.

The line interface circuit of FIG. 2 thus has the capability of providing a listen, or monitor-only, status for incoming calls, as well as providing full two-way communications. Thus, a caller may be allowed only to listen to the main conversation pool, by closing switch element 42a while the corresponding switch element 40a remains open. In this manner, the system selectively provides a monitor-only condition in which incoming calls cannot deliver signals to any bus line, but signals from the buses can be heard on the incoming telephone line 10.

Referring again to FIG. 1, each line interface 16 as well as the annunciator interface 20, the recorder interface 28, and the operator interface 22, receives a sequence of digital control signals from the processor 30 over the low speed digital bus 36. The low speed digital bus typically carries an address signal which identifies the element with which the processor will communicate. The address signal typically is in the form of a plurality of data bits which are applied either to the processor from an interface element 16, 20, 22 or 28; or from the processor to an interface element. The digital bus 36 also carries timing and control data. The processor 30, in response to commands from the keyboard/display unit 32, and in response to a program stored in a memory device 54, provides the timing and control signals to the various operating elements. It is well within the skill of one practiced in the computer art to program a general purpose digital computer to implement in this manner the functional operating system described herein.

The illustrated recorder interface 28 connects the buses 18 to the external recorder 26 over a line 46, and can have for example a plurality of switch elements similar to the interface switch elements 40 and 42 just described with reference to FIG. 2. The particular bus or buses connected to the external recorder are selected by an instruction from the processor 30 over the low speed digital bus. Preferably, the external recorder provides a loop recording, for example a two minute loop, and operates continuously to provide a recording of the previous two minutes of audio information on the selected bus. Alternatively, separate recorders can be connected to different ones of the buses to record simultaneously the conversations occurring on the selected buses.

The operator interface 22 responds to the control signals on the low speed digital bus to connect the operator headset 25 to a selected bus 18, and thereby enables the operator to monitor and/or converse with the caller(s) connected to that bus. The operator can control the bus connection through the keyboard/display unit 34. The display on the keyboard/display unit provides, in the illustrated embodiment, data relating to the status of each incoming telephone line. This status can include, for example, "on hook", "annunciator", "main pool", "subsidiary pool", "operator", and "wait". ("Wait" can correspond to a condition where the incoming call is not connected to any of the conferencing groupings, but rather is waiting for operator intervention.)

As also shown in FIG. 1, a main pool interface circuit 56 and a subsidiary pool interface circuit 58 connect to the main bus 18a and to subsidiary pool buses 18b–18f, respectively. The main pool circuit 56 connects to the digital processor over bus 34, and the subsidiary pool circuit 58 connects to the processor over bus 36. Each pool interface circuit 56 and 58 monitors the conversations taking place on the connected buses and provides the processor with data representing, for example, the duration of a conversation grouping, and the existence of a member of the pool who needs assistance from the system operator. A caller can signal this need for assistance, for example, by pressing one or more buttons of a Touch-Tone ® telephone.

The analog embodiment of the invention described in connection with FIGS. 1 and 2 provides, for a relatively small system, economically practical apparatus according to the invention. However, as the number of incoming telephone lines, and hence the number of lines which can be connected to a single pool, increases, the analog embodiment has several short-comings. The increase in the number of interconnected lines increases the complexity of the analog circuits if a satisfactory signal-to-noise ratio is to be maintained. In addition, the analog embodiment has a large portion of its control circuit centralized in order to control the functions of the several interface elements effectively and at a reasonable cost. Such a commonality of control generally requires that the entire apparatus be shut down should one or more components of a centralized control element need repair or service. In addition, the components of the analog system are somewhat expensive. A "digital/time multiplexed" embodiment accordingly is advantageous in at least some practices of the invention.

Referring now to FIG. 3, a preferred digital/time multiplexed embodiment of the invention employs a single common pulsed analog bus 60 rather than the plurality of buses 18 of the analog embodiment because it uses time multiplexing of the incoming signals on the bus 60. According to this illustrated embodiment, each incoming paired telephone line 10 is an input to a corresponding line card 62. Each line card 62 has circuit elements that form a control circuit 64, filter elements 66 and 68, and switching elements 70 and 72. The output of each switching element 70 is a pulsed analog signal that is applied as an input to a control element 74. The control element 74, which is common to all the paired lines, controls the operation of the numerous switching elements 70 and 72, as well as all other operational functions occurring in the system.

According to the illustrated embodiment, each incoming telephone line, and hence each line card 62, is assigned a sequence of non-overlapping time intervals during which the associated telephone line is sequentially sampled. The output of each card 62 over a line 76 from switch element 70 hence is a periodically sampled version of the input signal over the associated line 10. The output signal is thus a pulsed analog sample of the input signal on that line. The time it takes to sample all of the line cards is designated a scanning cycle. Therefore, within the scanning cycle, each line card is assigned a time slot, generally equal to 1/n of the duration of the scanning cycle. During each time slot, the audio input over the associated telephone line 10 is delivered to the control element 74 and hence is available for application to the bus 60. The time slots occur periodically and do not overlap one another. During the time slot that a switch 70 is closed, one or more switch elements 72 also close, thus enabling other lines of a conversation or conference pool to hear the person who is speaking, i.e. to receive the incoming message.

For each successive time slot, the next successive switch 70 closes and the previously closed switch 70 opens. Corresponding to each time slot in which a switch 70 is closed, one or more switches 72 of other calling lines associated with the same pool close. In this manner a plurality of separate conversation groupings or pools can be arranged wherein each pool or grouping forms a private listening and conversing group. The pools or groupings are thus separate, in a communications sense, from each other and yet are all under the flexible control of control element 74.

Figure 4:
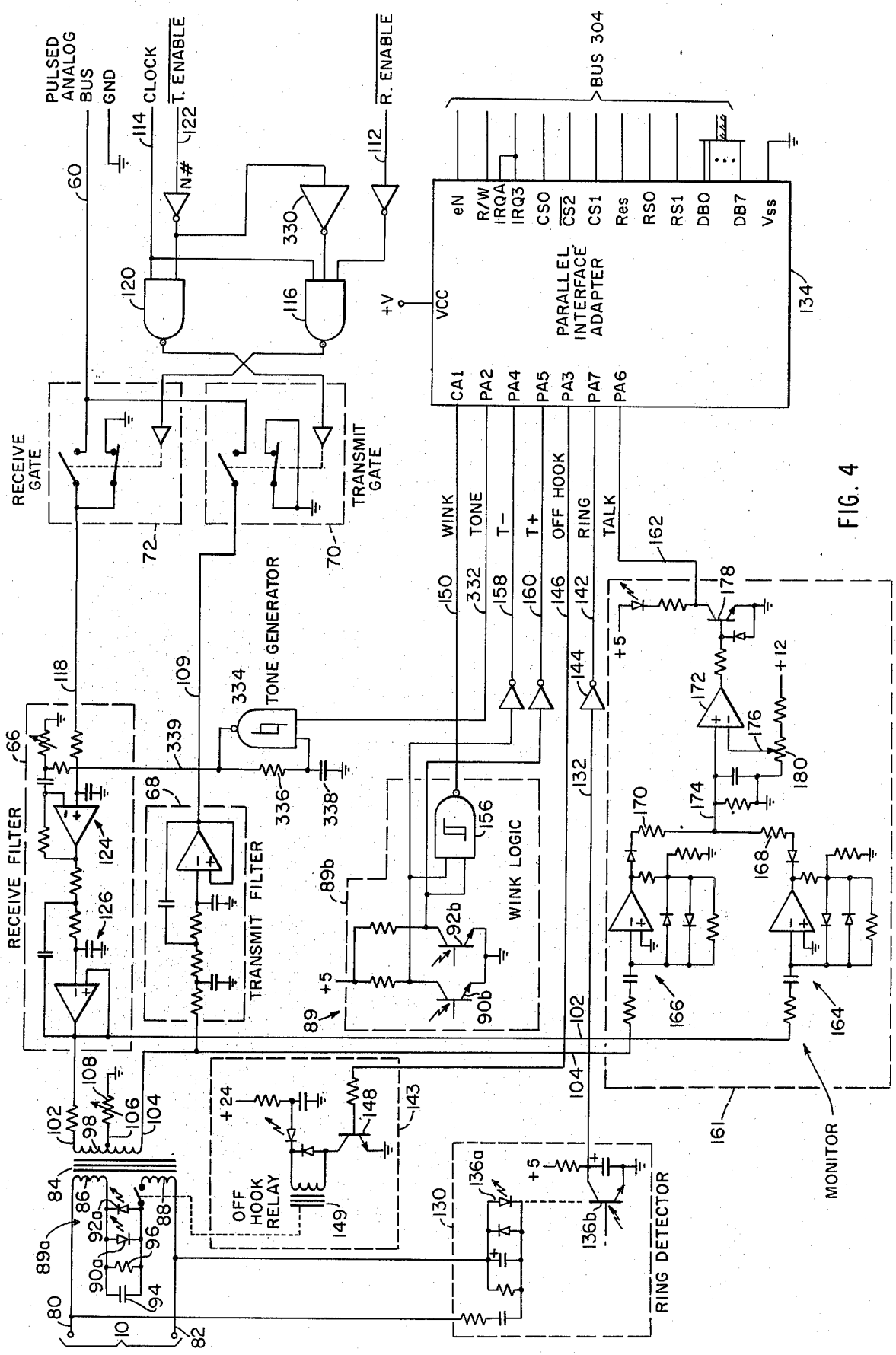
FIG. 4 is a detailed electrical schematic of a line circuit for the system of FIG. 3 according to the invention.

Referring to FIG. 4, which shows the circuit typical for one line card 16 according to the illustrated embodiment, each line card 62 receives the tip and the ring signals from a telephone line 10 over conductors 80 and 82 respectively. These conductors connect to a transformer 84 which has primary windings 86 and 88. the primary windings 86 and 88 connect, in a series arrangement, through "Wink" monitoring logic 89 shown with two stages 89a and 89b. The illustrated "Wink" monitoring logic 89 has two opto-isolators (also called photo-isolators) 90 and 92, each having a light-emitting diode portion 90a and 92a coupled with a phototransistor portion 90b and 92b, respectively. The oppositely-poled parallel diodes 90a and 92a are in parallel circuit connection with a capacitor 94 and with a resistor 96. The secondary winding of transformer 84 includes a center-tapped winding 98. Center-tapped winding 98 receives over a line 102 the outgoing signal to be placed on telephone line 10 and provides over a line 104 the incoming signal coupled from telephone line 10. The center tap of the transformer, line 106, is grounded through a variable resistor 108. As used herein, signals are designated relative to the telephone line conductors 80 and 82, and accordingly the signals incoming to a line card 16 from the telephone line are designated the "transmit-related" signals and the outgoing signals onto the telephone line are designated the "receive" signals.

The incoming signals on line 104 pass through the filter element 68 which, in the illustrated embodiment, is a low-pass filter having a 4 Khz. passband. Filter element 68 removes the undesirable high frequency noise associated with the incoming voice signals. A line 109 applies the output of filter 68 to the common bus 60 through controlled switch element 70. The illustrated switch element 70 is a digitally-controlled analog switch having a two-pole, single-throw configuration. A Transmit Enable signal over a line 122, together with a Clock signal over a line 114, controls the operation of switch element 70 through a gate 120; the origin and logic of these and other control signals is described below with reference to FIGS. 5-8.

Signals appearing on the bus 60 pass through the control switching element 72, which is also a digitally-controlled analog switch having a two-pole, single-throw action, as FIG. 4 shows. The switch element 72 connects a receive line 118 to either the bus 60 or ground, depending upon the output of a gate element 116. The gate element 116 receives a Receive Enable signal from an enable line 112, the timing signal on the clock line 114, and the output of an inverter 330.

The received signal on line 118 will, as described below, be a pulsed analog signal. Furthermore, the signal appearing on line 118, during those time slots wherein it corresponds to the signal on bus 60, can be received by a plurality of different line cards. Hence, filter 66 has a receive amplifier 124 to provide a fixed, standard high input impedance. The output of the receive amplifier 124 passes to a filter circuit 126, which smooths the receive signal and removes what, to the human ear, appears to be undesirable high frequency noise. Filter 66 provides an audio output signal over line 102 to the transformer 84, for delivery to the telephone line conductors 80 and 82.

With further reference to the line card 62, typical of other line cards as appear in FIG. 3, the illustrated arrangement which FIG. 4 shows employs structure for enabling the line card to provide a central processing control element, for example control element 74 of FIG. 3, with information regarding the status of the incoming telephone line, such as telephone conditions and voice energy relationships. For this purpose, a ring detector circuit 130 connects across the tip and ring conductors 80 and 82 and provides, in response to a ringing signal on conductors 80 and 82, an output signal over a line 132 to a parallel interface adapter 134. The interface adapter may be, for example, a type 6821 circuit element commercially available from Motorola SemiConductor Products Inc. The adapter modifies signals to enable a controller, such as the central processing unit described below with reference to FIG. 8, to sense and to control signals present in the line card 62 circuits. The ring detector has a photo-isolator 136 which consists of a light-emitting diode 136a optically coupled to a phototransistor 136b. The ring detector responds to the ringing signal on the telephone line conductor to actuate the phototransistor 136b. The resultant output signal on line 132 passes through an inverter 140 to provide the Ring signal on a line 142.

Line card 62 further has an off-hook relay circuit 143. The Off-Hook relay circuit 143 responds to an Off-Hook signal over a line 146 from the parallel interface adapter 134, and thereby in effect to receive an incoming call, by "answering" the incoming call and placing the telephone line in an off-hook condition. A transistor 148 turns On in response to the Off-Hook signal thereby energizing the coil of an off-hook relay 149. The relay 149 has a normally-open contact in series between the conductors 80 and 82, illustratively between the transformer windings 86 and 88. The off-hook condition is generated by the control element, for example processor 74, and applied to the interface adapter 134, in response to the Ring signal which the ring detector 130 produces.

The illustrated line card 62 also has a circuit for detecting the termination or disconnect of a telephone call. This circuit senses a "Wink" signal from the telephone office, on conductors 80 and 82, and applies a resultant signal to the interface adapter 134 over a line 150. The illustrated Wink-sensing circuit responds by using light emitting diodes 90a and 92a to the line current which is normally present on the telephone line conductors 80 and 82. Each diode is optically coupled with an associated phototransistor 90b and 92b, respectively. These diodes respond respectively to positive and negative currents on input conductors 80 and 82. Via the optical coupling, phototransistor 90b and 92b, respectively, become conductive. Phototransistors 90b and 92b connect to a gating element 156 which applies the "Wink" signal to the interface adapter 134 when both transistors are Off.

The concurrent turn-off of transistors 90b and 92b occurs when reversal of current or momentary loss of loop current, indicative of a disconnect, occurs on conductors 80 and 82. During this transition, both phototransistors remain in an Off condition for an extended time due to the parallel arrangement of capacitor 94. Thereby, the output of gating element 156 (which may be for example a Schmidt trigger) changes, and this signal transition is "captured" by the parallel interface adapter 134. Signals corresponding to the state of each LED 90a and 92a also connect to the parallel interface adapter over lines 158 and 160, respectively.

Each line card 62 further has a conversation monitor circuit 161, shown at the bottom of FIG. 4, which provides an output signal over a line 162 whenever the amplitude of the energy, here the voltage, on line 104 exceeds the energy on line 102 in a predetermined manner. Lines 102 and 104 are the inputs to amplifiers 164 and 166, respectively. The outputs of amplifiers 164 and 166 connect through resistors 168 and 170 to the input of an operational amplifier 172, which acts as a comparator. The signal at the junction of resistors 168 and 170 corresponds to the difference between the energy level on line 104 and the energy level on line 102. Comparator 172 compares the difference signal on a line 174 to a DC reference signal level on a line 176, and in response generates an output signal to a grounded emitter transistor 178. The output of transistor 178 is the Monitor signal over line 162. A variable potentiometer 180 determines, by the setting of its wiper contact, the selected reference signal level over line 176. Other embodiments of the invention can employ different, for example multiplicative, relationships between the energy levels on lines 102 and 104 to provide the energy-minitoring function.

Figure 5:
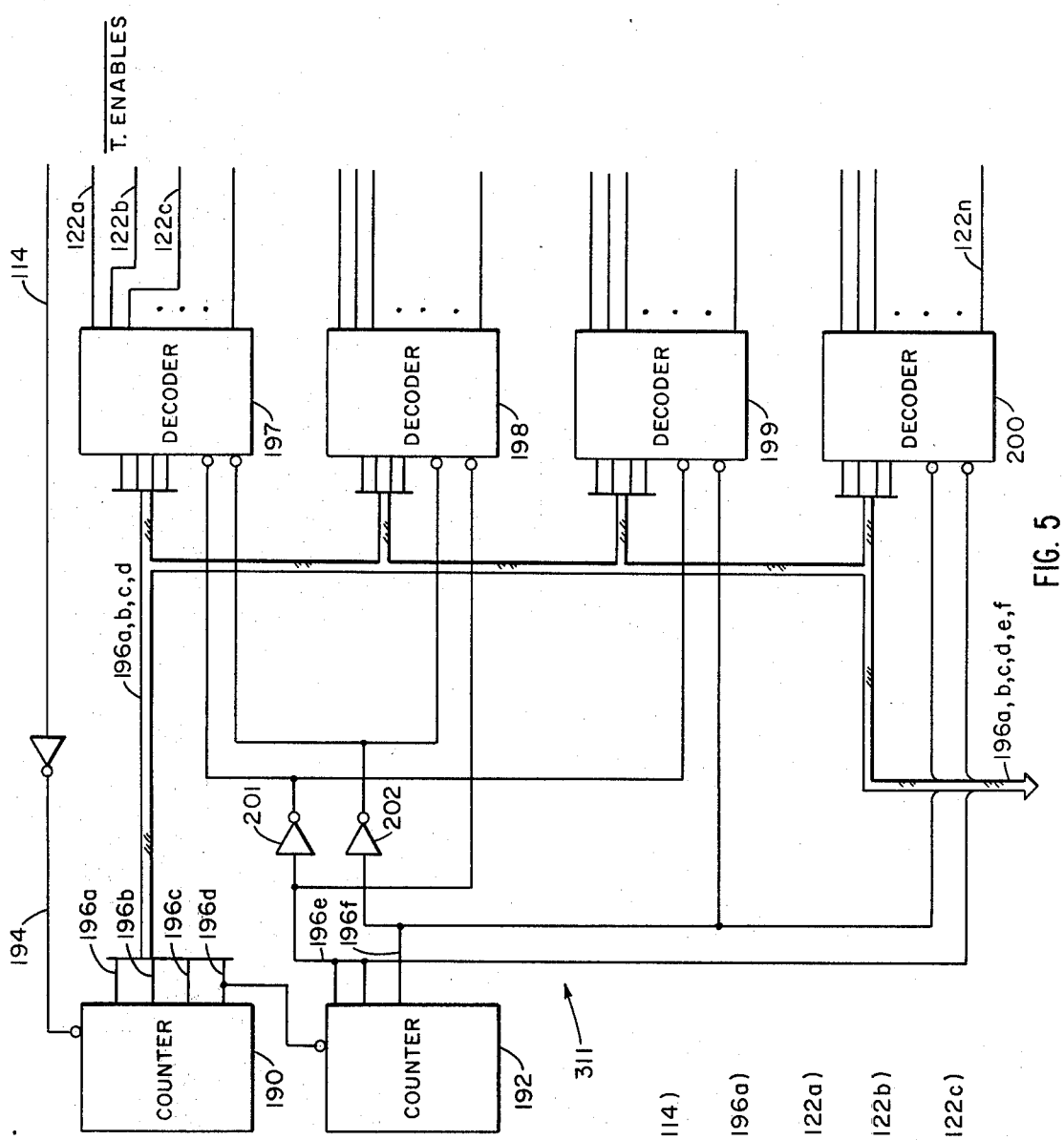
FIG. 5 is a detailed electrical schematic of the transmit enable circuit according to a preferred embodiment of the invention.
Figure 6:
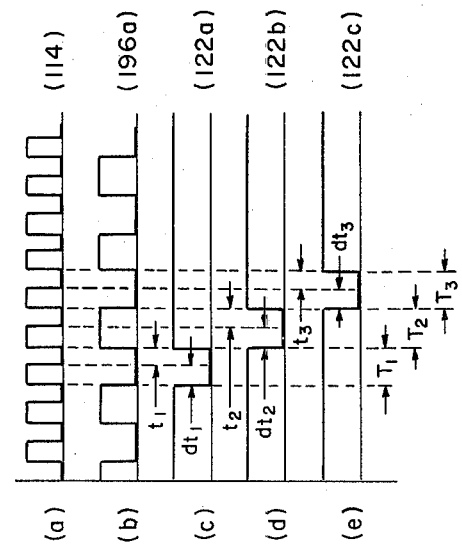
FIG. 6 is a timing diagram related to several of the signals of FIG. 5.

Having described the illustrated line card in detail, the circuits for generating control signals for these line cards will be described. Referring to FIGS. 5 and 6, the Transmit Enable signal over line 122 to each line card is a periodic enabling signal for operating the corresponding transmit switch element 70 for a short time duration, i.e. one time slot, in each scanning cycle. Accordingly, each transmit switch element closes once per scan cycle in response to the associated Transmit Enable signal. This results in the sampling of an incoming telephone signal once in each scanning cycle. The time slot allocated to sample each telephone line input has a time duration and a time of occurrence such that the time slot allocated to any one telephone line input does not overlap the time slots allocated to any other telephone input. Furthermore, as described below, the sampling time slots are separated from each other by a "dead time", during which a circuit, e.g. the FIG. 4 switch element 72, applies a selected signal level, preferably ground, to the associated receive line 118 of FIG. 3. The "dead time" and the "time slot" together define the "time interval" associated with a line card.

In the illustrated embodiment of the invention, the Clock signal over line 114 (FIGS. 4 and 5) controls the timing for sampling incoming signals. The Clock signal is preferably a square wave with a waveform (a) as shown in FIG. 6. (The number in parentheses in FIG. 6 represents the line on which the signal appears.) A multi-state binary counter, employing in the illustrated embodiment two four-bit binary counters 190 and 192, increments cyclicly in response to each clock pulse on line 194. The counter accordingly develops on lines 196 a six-bit parallel output which repetitively cycles from binary "zero" (000000) through binary "sixty-three" (111111). The waveform of the low-order bit of the output, over line 196a, is illustrated (in line (b) of FIG. 6. The six-bit output of counters 190, 192 is applied to a set of four-bit decoders 197, 198, 199, 200. Each decoder, when enabled, provides one of its sixteen output lines with an active level as determined by the four-bit binary count input. Decoders 197, 198, 199, 200 together thus form a one of sixty-four line decoder.

With further reference to FIG. 5, the two high-order bits of the six-bit binary count, on lines 196e and 196f, are inverted with inverters 201 and 202 to provide enabling gating levels for sequentially enabling the sixteen output-lines of decoders 197, 198, 199, and 200. The outputs of the decoders are the Transmit Enable signals on lines 122, and the signal waveforms on the first three lines, i.e. lines 122a, 122b, and 122c, are illustrated in lines (c), (d), and (e) of FIG. 6. Other embodiments of the invention can employ other counter and decoder arrangements, or different equivalents, for generating the Transmit Enable signals.

With the foregoing logic, switch element 70a, of the first line card 62a as shown in FIG. 4, provides a through path from the filter element 68a to the Pulsed Analog bus 60 during a time slot $t_1$, in the time interval $T_1$ (FIG. 6). Similarly, on the second line card 62b (FIG. 3), the transmit enable signal on line 122b actuates switch element 70b during a time slot $t_2$ of time interval $T_2$, etc.

Thus, the illustrated embodiment employs sixty-four separate "time slot" connections to the bus 60. Further, a dead time $dt_i$, shown in FIG. 6, between successive time-slot connections isolates each connection from other connections. The dead time duration, in the illustrated embodiment, equals the duration of the time slot. The "dead time" duration between adjacent time slots $t_1, t_2, \ldots$, advantageously allows transient signals on the bus 60 to dissipate.

As noted above, each line card can connect to the bus 60 through switch element 72 at any of a plurality of time slots during which another card's switch element 70 connects its incoming telephone line with the bus. The Receive Enable signals over lines 112 (FIG. 4) and the Clock signal over line 114 control this operation of the switch elements 70 through the gates 120. A typical Receive Enable signal over line 112 thus can have, during each scanning cycle, a plurality of selectively timed enable pulses. However, the selected time intervals during which the Receive Enable signal will be in the enable state will change as the participants of the various groupings or pools change.

Figure 7:
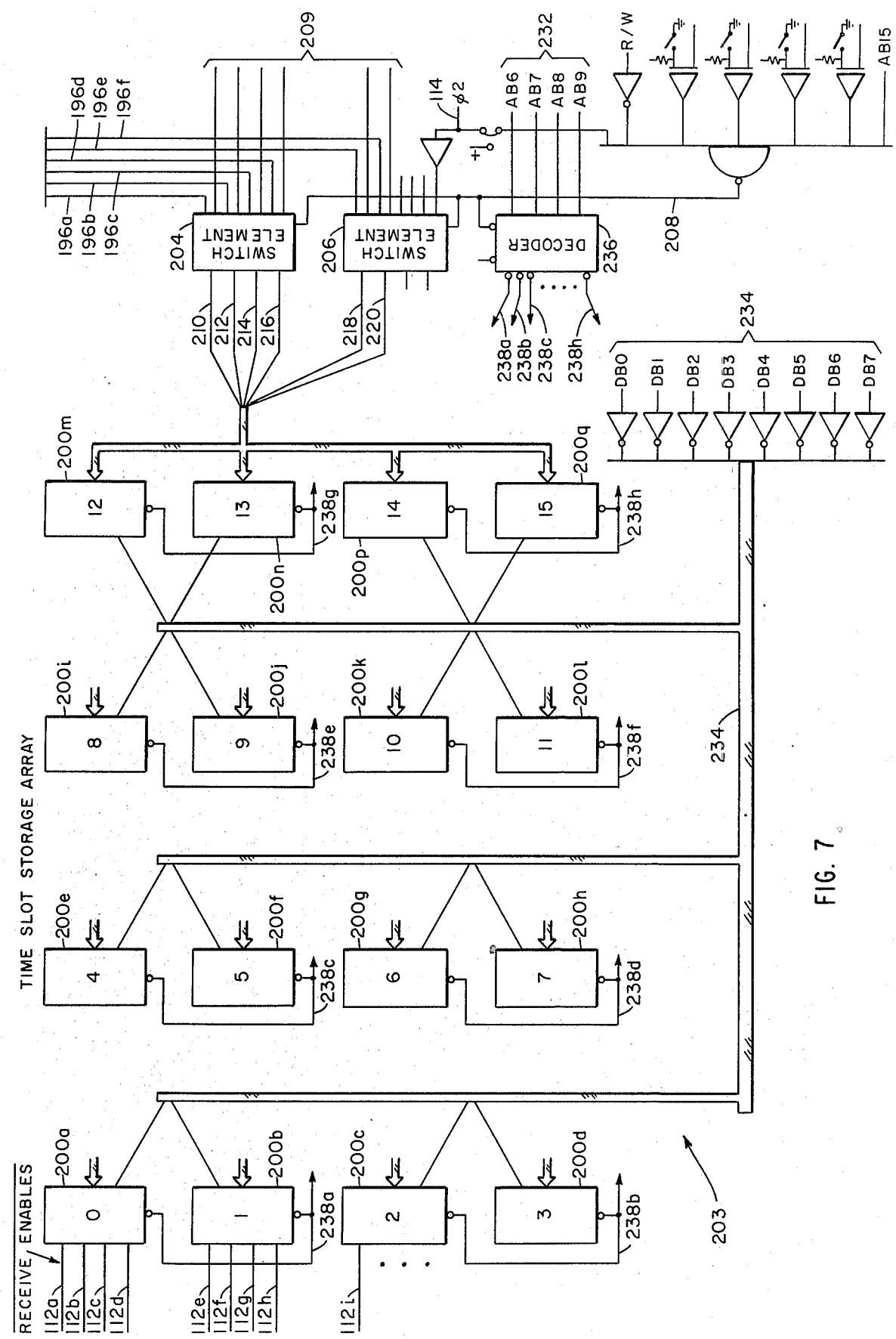
FIG. 7 is a detailed electrical schematic of the receive enable logic according to a preferred embodiment of the invention.

To provide this flexible operation, there is a receive enable generator 203 shown in FIG. 7. The generator 203 has a plurality of memory elements 200. Memory elements 200 effectively form, in the illustrated embodiment, a 64×64 element memory array. During each time interval of a scanning cycle a different sixty-four bit row of the array is read out. The data composition of that row indicates the state of the Receive Enable signals and determines the state of each switch element 72. The receive enable generator of the invention further has logic elements for loading data into the memory elements 200 and thereby alter the memory elements.

The control logic for the receive enable generator, FIG. 7, employs two digital switching elements 204 and 206. Depending upon the state of an Enable signal level over a line 208, each switching element passes one of two sets of input signals, either inputs on lines 196 or the inputs on lines 209, to output lines 210, 212, 214, 216, 218, 220. These input lines to the elements 204 and 206 represent either the output lines 196 of transmit enable generator counter elements 190 and 192 (FIG. 5), or represent data from a controlling digital processor, described below with reference to FIG. 8, over the lines 209. The output of the switching elements 204 and 206 connect to each memory element 200 and specify the time interval (corresponding to the row or column of the memory array) during which data will be written.

In the illustrated embodiment, each memory element 200 represents a 4×64 element array. Each of the memory elements accordingly generates four Receive Enable signals, for example signals over lines 112a, 112b, 112c, and 112d. With this arrangement, in a Read condition, corresponding to a Read Enable signal level over line 208, a column of data specified by output lines 210, 212, . . . , 220 appears on output lines 112, thereby enabling one or more receive switch elements. In those instances where data from the digital control processor (FIG. 8) is entered into the memory elements from lines 235, as described further hereinbelow, the receive enable generator 203 writes the data at a memory row or column (i.e. a time interval) corresponding to the (address) data input from the digital processing element over lines 209, which appears as the address data on lines 210, 212, . . . , 220, and in memory elements selected by the memory address on bus 232.

Each illustrated memory element stores four bits at a time, whereas the data provided by the illustrated digital processor typically is in eight-bit words. To accommodate this difference in format, one-half of each word is stored in each of two associated memory elements 200. The two memory elements are selected by the output of a decoder 236, FIG. 7. The illustrated decoder 236 converts the binary input over lines 232 to one of the eight output lines 238. Each line 238, in turn enables two associated memory elements 200, one of which stores the high-order four bits of the data word and the other of which stores the low-order four bits of the data word. Thus, when the Read/Write signal over line 208 is in the Write condition, the eight-bit data over write bus lines 234 is written into the selected memory element 200 as determined by the signal levels on lines 238 and at the selected locations specified by the signal levels on lines 210–220. It will be obvious to one skilled in the art that other configurations of memories and memory arrays, and control elements for the memory arrangement can be employed.

Referring now to FIG. 8, the illustrated digital/time multiplex embodiment of the invention employs a central processing unit (CPU) 300 and an associated read-only memory (ROM) 302 to control the system operation. The central processing unit connects to a line card bus 304 through a two-way buffer element 306. The buffer element provides isolation between the bus 304 and the CPU input/output circuits. The bus 304 connects at each line card 62 with the associated parallel interface adapter 134 (FIG. 4). Thus, data travels directly from the central processing unit to and from the line cards.

As noted above, the central processing unit provides address, data, and control information to the receive enable generator 203 over lines 209, 232, and 234. The receive generator provides the Receive Enable signals over lines 112. The transmit enable generator 311 (FIG. 5) receives the Clock signal over line 114 from the line card bus and provides synchronized time interval count data over lines 196 to the receive enable generator 203 and further provides the Transmit Enable signals over lines 122 as described above.

Comparing FIG. 8 with FIG. 3, the control element 74 thus corresponds to the central processing unit 300, the transmit and receive enable generators 311 and 203, and their associated memories, buffers, and interfacing apparatus as descried in more detail below.

The illustrated digital/time multiplex embodiment of the invention shown in FIG. 8 accommodates fifty incoming telephone lines over conductors 80 and 82, grouped in two sets of twenty-five each. The operation and interconnection of these lines through line cards 62 with both the central processing unit 300 and the common bus 60 have been described in detail above.

At start-up of the apparatus, the central processing unit receives the operating program from a disc controller/floppy disc drive 310. After the operating system has been loaded into the central processing unit, the central processing unit interfaces with the keyboard/display element 32 through a random access memory (RAM) 312 and a keyboard/display interface 314. The operation and circuit configuration of the random access memory and the keyboard/display interface are conventional to one skilled in the art and are not described further. Further, alternative to storing the operating program on disc as illustrated, other known arrangements can be used including, for example, storage in a read-only memory (ROM) such as the illustrated ROM 302.

The line card bus 304, in the illustrated embodiment, also connects to an annunciator interface 316 which is a digital version, adapted for multiplex operation, of the annunciator interface 20 described in connection with FIG. 1. Interface 316 applies, in accordance with control signals on the line card bus 304 and the corresponding Transmit Enable signal, a recorded message from a controlled external recorder 318 to the pulsed analog bus 60. The operation of the annunciator interface corresponds to that of the transmit portions, e.g. elements 70 and 116 of the line card elements.

Line card bus 304 further connects to a digital operator interface 320 which corresponds in function to the analog operator interface 22 (FIG. 1). The operator interface 320 enables an operator to hear through a set of ear phones 322, and to speak through a microphone 324, under control of the CPU, to one or more of the groupings which have been organized under control by the central processing unit in response to input data from keyboard/display terminal 32.

In operation with the illustrated system of FIG. 8, the CPU initialized program reads the main program from the disc controller/floppy disc drive 310 according to a boot strap procedure stored in its ROM 302. Thereafter, the central processing unit operates in response to keyboard instructions from the terminal 32 through the keyboard/display interface 314 and random access memory 312. The operations of the keyboard/display interface and of the RAM are conventional and well known in the art.

The apparatus thus described allows incoming telephone callers to be grouped in any of a plurality of operating groups, or in a single grouping or conversation pool. In typical operation, an incoming call receives the annunciator message and thereafter connects, for example, to the main conversation pool. An operator also preferably queries the caller, for example, for correct identification of the incoming call for billing purposes. Prior to operator intervention, however, the caller can first enter the main conversation pool in a "receive-only" condition. In this condition, a normally occurring enabling signal level on the transmit enable line 122 is negated by a simultaneously occurring receive enable line 112 signal which inhibits actuation of switch element 70 on the associated line card by the transmitted signal. The Receive Enable signal inhibits actuation of the switch element 70 through a gate element 330 (FIG. 4) acting upon gate element 116. In this structural configuration, therefore, the new caller can listen to a selected conversation pool but is unable to communicate with others in the pool. This procedure differs from the normal operation of the apparatus, wherein the incoming caller can both listen and talk to other callers connected in the same pool.

In a preferred digital/time multiplex embodiment of the invention, the apparatus has a voice responsive vote tallying system. This feature enables the apparatus to provide the cumulative number of responses, in a selected answer time period, to a question or statement directed to the then members of a pool. As shown in FIG. 4, the tallying circuit includes the monitor circuit 161 which employs amplifiers 164, 166 and 172, and which produces an indicating signal level over line 162 as noted above. At selected time intervals, the central processing unit 300, through buffers 306 (FIG. 8), monitors the lines 162 over line card bus 304 and adds or tallies the voice responses occurring in the selected time duration. The processor 300 also provides a confirming tone to each telephone line from which a response was received. The operator receives the results of the "tally" through the RAM 312 and the keyboard interface on keyboard/display 32.

More particularly an incoming telephone line 10 receives the confirming tone in respomse to an actuating signal on a tone line 332 shown in FIG. 4. The actuating signal on the tone line 332 originates in the processor 300 and is applied by the bus 304 to the parallel interface adaptor 134. The tone line 332 connects to and enables a gating element 334. The gate element together with a resistor 336 and a capacitor 338 form a relaxation oscillator that produces, when the gate element is enabled, the output tone on a line 339. The output of the tone generator forms an input to the receive amplifier 124 of filter 66. This results in an audible tone being heard on telephone line 10 of the particular line card.

With reference again to FIG. 8, in various alternate embodiments of the invention, the operator's keyboard/display unit 32 can employ a plurality of dedicated illuminated elements 340 to indicate, specifically for each incoming line 10, whether the line is in a receive-only status and/or whether the caller on that line is speaking. When the illumination elements 340 are employed to provide a visual signal representing the status of an incoming line, the illustrated CPU 300 and the RAM 312 are the sources of the activating electrical signals. In an alternative embodiment of the invention, the activating electrical signals are converted in keyboard/display interface unit 314 to provide, to the display portion of keyboard/display 32, alphanumeric data representing the status of each incoming line.

Other embodiments of the analog and the digital/time multiplexed embodiments of the invention will be obvious to those skilled in the art. Thus, additions, subtractions, deletions, and other modifications of the preferred described embodiments will be obvious to those skilled in the art and are within the scope of the claims. In particular, the programming of the central processing unit 300 which controls system operation in the manner and with the system elements described, employs skills and techniques conventional to those skilled in the art.

Having described the invention, what is claimed as new and secured by Letters Patent is:

1. Caller-initiated telephone conferencing apparatus comprising caller-responsive input means for concurrently receiving a plurality of incoming telephone line calls over an associated plurality of incoming telephone lines and including means for responding to a signaling indication on any incoming telephone line for conditioning the line for communication, and switching means responsive to said input means for automatically connecting the conditioned lines associated with said incoming calls to a conference grouping wherein any of said associated incoming lines in the grouping provides communication with all other lines connected to said grouping and said grouping has the capacity of at least three incoming calls.

2. The telephone conferencing apparatus of claim 1 wherein said switching means further comprises means for selectively switching any of said incoming lines to a private inquiry receiving condition wherein said selected line is isolated from communication with any other incoming line, and further comprising means for connecting an operator controlled communication line in voice communication with said selected line.

3. Caller-initiated telephone conferencing apparatus comprising caller-responsive input means for concurrently receiving a plurality of incoming telephone line calls addressed to a common telephoning number over a plurality of incoming telephone lines and including means for responding to a signaling indication on any incoming telephone line for conditioning that line for communication, and switching means operable at the telephone station of said addressed number and responsive to said input means for selectively interconnecting conditioned incoming lines into a conference grouping, wherein any incoming line in said grouping can communicate with other incoming lines of the grouping, and wherein said grouping has the capacity of providing communication with at least three incoming calls, said switching means providing said interconnecting of each conditioned incoming line independently of the interconnecting of other incoming lines.

4. A caller-initiated telephone conferencing method comprising the steps of concurrently receiving a plurality of incoming telephone line calls over an associated plurality of incoming telephone lines, responding to a caller-initiated signaling indication on any incoming telephone line for conditioning that line for communication, and automatically connecting conditioned lines associated with said incoming calls to a conference grouping wherein any of said associated incoming lines in the grouping provides communication with all other lines connected to said grouping and said conference grouping has the capacity of at least three incoming calls.

5. A caller-initiated telephone conferencing method comprising the steps of concurrently receiving a plurality of incoming telephone line calls addressed to a common telephone number over an associated plurality of incoming telephone lines, responding to a caller-initiated signaling indication on any incoming telephone line for conditioning that line for communication, selectively interconnecting conditioned incoming lines into a conference grouping, said incoming lines in said grouping having communication with other incoming lines of said grouping, and said conference grouping having the capacity of providing communication with at least three incoming calls, and providing said interconnection of each conditioned line independently of the interconnection of other incoming lines.

6. Caller-initiated telephone conferencing apparatus comprising caller-responsive input means for concurrently receiving a plurality of incoming telephone line calls from a plurality of callers at different calling numbers over a plurality of incoming telephone lines and including means for responding to a signaling indication on any incoming telephone line for conditioning that line for communication, and switching means responsive to said input means for connecting each said conditioned incoming line to a conference grouping wherein any incoming line in a grouping can communicate with other incoming lines connected to said grouping and wherein each conference grouping has the capacity of at least three incoming calls.

7. Caller-initiated telephone conferencing apparatus comprising caller-responsive input means for concurrently receiving a plurality of incoming telephone line calls from a plurality of callers at different calling numbers over a plurality of incoming telephone lines, and switching means responsive at least in part to each said incoming call for connecting each said incoming line to a conference grouping wherein any incoming line in a grouping can communicate with other incoming lines connected to said grouping and wherein each conference grouping has the capacity of at least three incoming calls, said switching means providing said interconnecting of an incoming line independently of the interconnection of other incoming lines.

8. Caller-initiated telephone conferencing apparatus comprising caller-responsive input means for concurrently receiving a plurality of incoming telephone line calls addressed to a common telephone number from a plurality of callers at different calling numbers over a plurality of incoming telephone lines and including means for responding to a signaling indication on any incoming telephone line for conditioning that line for communication, and switching means responsive to said input means for connecting each said conditioned incoming line to a conference grouping wherein any incoming line in a grouping can communicate with other incoming lines connected to said grouping and wherein each conference grouping has the capacity of at least three incoming calls.

9. Caller-initiated telephone conferencing apparatus according to any of claims 6, 7 or 8 further comprising means for automatically disconnecting from said apparatus an incoming line in response to the caller hanging up.

10. The telephone conferencing apparatus of claim 1 further comprisng means for disconnecting an incoming line from said appratus in response to a caller hanging up.

* * * * *